US009681454B2

(12) United States Patent
Chen et al.

(10) Patent No.: US 9,681,454 B2
(45) Date of Patent: Jun. 13, 2017

(54) UPLINK SCHEDULER ALGORITHM FOR ORTHOGONAL DIVISION MULTIPLE ACCESS SYSTEMS

(75) Inventors: Pi-Chun Chen, Lake Hiawatha, NJ (US); Sigen Ye, Randolph, NJ (US); Yifei Yuan, Livingston, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1738 days.

(21) Appl. No.: 11/951,647

(22) Filed: Dec. 6, 2007

(65) Prior Publication Data

US 2009/0147736 A1   Jun. 11, 2009

(51) Int. Cl.
*H04W 72/08* (2009.01)
*H04W 52/24* (2009.01)
*H04W 72/04* (2009.01)
*H04W 72/12* (2009.01)

(52) U.S. Cl.
CPC ........ *H04W 72/082* (2013.01); *H04W 52/243* (2013.01); *H04W 72/042* (2013.01); *H04W 72/12* (2013.01)

(58) Field of Classification Search
CPC .................................................. H04W 72/082
USPC ....................................................... 370/319
See application file for complete search history.

(56) References Cited

U.S. PATENT DOCUMENTS

| | | | |
|---|---|---|---|
| 2001/0019961 A1* | 9/2001 | Nakahara et al. | 455/522 |
| 2003/0128658 A1* | 7/2003 | Walton et al. | 370/208 |
| 2003/0174686 A1* | 9/2003 | Willenegger et al. | 370/342 |
| 2007/0014263 A1* | 1/2007 | Ferrato et al. | 370/335 |
| 2007/0041429 A1* | 2/2007 | Khandekar | 375/146 |
| 2008/0123520 A1* | 5/2008 | Ji et al. | 370/216 |

OTHER PUBLICATIONS

Wikipedia, Signal-to-noise ratio, Dec. 6, 2005, http://replay.waybackmachine.org/20051206110951/http://en.wikipedia.org/wiki/Signal-to-noise_ratio.*

* cited by examiner

*Primary Examiner* — Jackie Zuniga Abad
(74) *Attorney, Agent, or Firm* — Davidson Sheehan LLP

(57) ABSTRACT

The present invention provides a method of scheduling uplink transmissions from at least one access terminal to an access network. The method includes estimating, at the access network, at least one signal-to-noise ratio associated with each access terminal and determining, at the access network, a format for the packet based upon the estimated signal-to-noise ratio. The method also includes ranking access terminals and allocating, at the access network, resources to access terminals for transmission based on each access terminal's priority and the determined format of the packet and transmitting, from the access network, information indicative of the resources allocated to each access terminal.

4 Claims, 3 Drawing Sheets

UPLINK SCHEDULER ALGORITHM FOR ORTHOGONAL DIVISION MULTIPLE ACCESS SYSTEMS

BACKGROUND OF THE INVENTION

1. Field of the Invention

This invention relates generally to communication systems, and, more particularly, to wireless communication systems.

2. Description of the Related Art

Conventional wireless communication systems include a network of base stations, base station routers, and/or other wireless access points that are used to provide wireless connectivity to access terminals in geographic areas (or cells) associated with the network. Information may be communicated between the network and the access terminals over an air interface using wireless communication links that typically include multiple channels. The channels include forward link (or downlink) channels that carry signals from the base stations to the access terminals and reverse link (or uplink) channels that carry signals from the access terminals to the base station. The channels may be defined using time slots, frequencies, scrambling codes or sequences, or any combination thereof. For example, the channels in a Code Division Multiple Access (CDMA) system are defined by modulating signals transmitted on the channels using orthogonal codes or sequences. For another example, the channels in an Orthogonal Frequency Division Multiplexing (OFDM) system are defined using a set of orthogonal frequencies known as tones or subcarriers.

Next (4th) generation wireless systems such as 802.16e WiMAX, UMTS Long Term Evolution (LTE) and cdma2000 EV-DO Revision C Ultra Mobile Broadband (UMB) are based on Orthogonal Frequency Division Multiple Access. In OFDMA, the transmitted signal consists of narrowband tones that are nearly orthogonal to each other in the frequency domain. A group of tones transmitted over the duration of one time slot (or frame) constitutes the smallest scheduling resource unit, also known as a tile, a resource block (RB), or a base node (BN). Different tones belonging to a tile may be scattered across the entire carrier frequency band used by the OFDMA system so that each tile transmission experiences diversified channels and interference on each sub-carrier. Alternatively, a tile can be formed of a contiguous set of tones so that the channel and interference experienced by the tile are more localized. Hybrid Automatic Repeat reQuest (HARQ) is employed to increase the capacity of the OFDMA system. To this end, the encoder packet transmission includes multiple HARQ interlaces repeating every certain number of frames and having a fixed maximum allowed number of sub-packet retransmissions.

OFDMA is a fully scheduled medium access control scheme on both the uplink and downlink channels. For example, in systems such as UMB that employ synchronous HARQ, a scheduler allocates tile-interlace resources for the duration of each encoder packet transmission. Many existing scheduler algorithms for OFDMA systems focus on downlink scheduler design and rarely address the design of the uplink scheduler. The few conventional uplink scheduler designs that have been discussed in the literature do not consider the constraints imposed by interference control. In particular, designs for conventional uplink schedulers fail to consider the constraint on the maximum transmit power spectral density of a access terminal imposed by interference power level control. The conventional uplink scheduler designs also fail to describe the process of packet format selection. Instead, existing uplink scheduler algorithms often assume that the access terminals all request a specific pre-determined data rate. Conventional uplink schedulers also do not consider packet format selection or the coding and modulation selection based on the RF channel condition fed back from the access terminals. Therefore, a degree of freedom for uplink scheduler design is missing from conventional uplink scheduler designs.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for scheduling uplink transmissions from at least one access terminal to an access network. The method includes estimating, at the access network, at least one signal-to-noise ratio associated with each access terminal and determining, at the access network, a format for the packet based upon the estimated signal-to-noise ratio. The method also includes allocating, at the access network, resources for transmission of each packet based on the determined format of the packet and transmitting, from the access network, information indicative of the resources allocated to each access terminal.

BRIEF DESCRIPTION OF THE DRAWINGS

The invention may be understood by reference to the following description taken in conjunction with the accompanying drawings, in which like reference numerals identify like elements, and in which.

Figure 1:
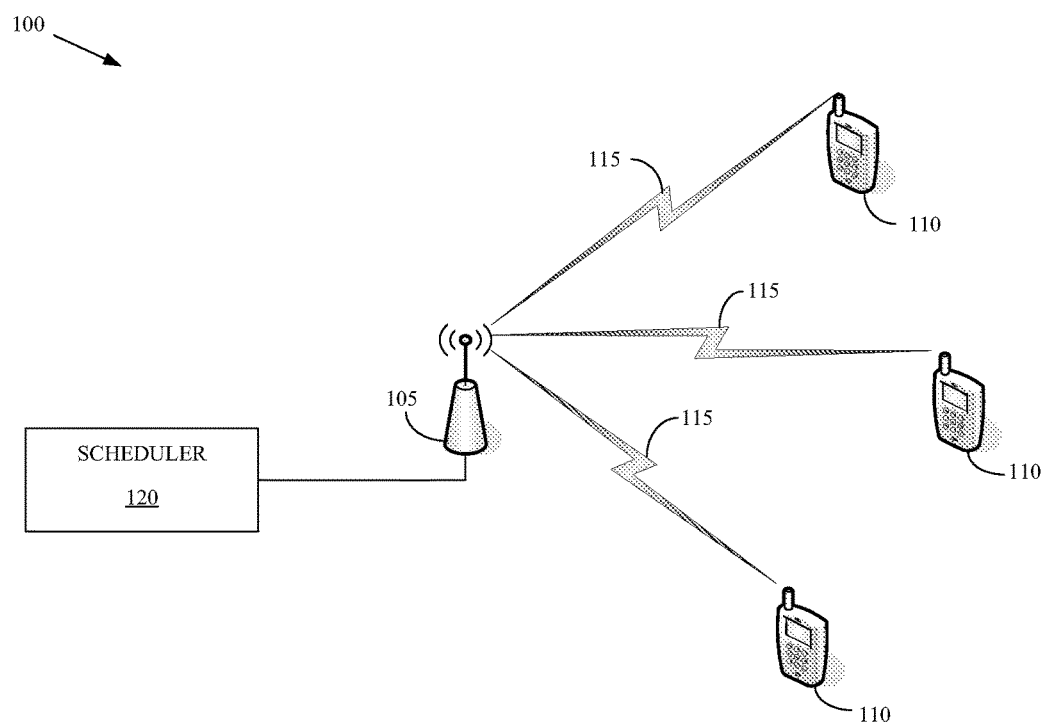
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes one or more base stations 105 (or access networks) that are used to provide wireless connectivity to one or more access terminals 110 over corresponding air interfaces 115. Wireless connectivity may be provided according to the standards and/or protocols defined for next (4th) generation wireless systems such as 802.16e WiMAX, UMTS Long Term Evolution (LTE) and cdma2000 EV-DO Revision C Ultra Mobile Broadband (UMB), which are based on Orthogonal Frequency Division Multiple Access (OFDMA) techniques that may implement Hybrid Automatic Repeat reQuest (HARQ) to increase the capacity of the OFDMA system. Techniques for implementing and/or operating systems that provide wireless connectivity according to next generation wireless standards and/or protocols are known in the art and in the interest of clarity only those aspects of implementing and/or operating the systems that are relevant to the present invention will be discussed herein. Furthermore, persons of ordinary skill in the art having benefit of the present disclosure should appreciate that the present invention is not limited to next generation wireless communication systems and/or systems that implement OFDMA. In alternative embodiments, the wireless communication system 100 may be any generation system that operates according to other standards and/or protocols.

The wireless communication system 100 also includes a scheduler 120 for scheduling the resources used for communication over the air interfaces 115. For example, the scheduler 120 may be used to allocate tiles, resource blocks (RBs), and/or base nodes (BNs) for communication over the air interfaces 115. The scheduler 120 may also determine whether the tones belonging to a tile are to be scattered across the entire carrier frequency band used by the OFDMA system 100 or are to be formed of a contiguous set of tones. In one embodiment, the scheduler 120 may be implemented within the base station 105. However, persons of ordinary skill in the art having benefit of the present disclosure should appreciate that in alternative embodiments the scheduler 120 may be implemented in any location or combination of locations. For example, the scheduler 120 may be implemented in a radio access network (not shown in FIG. 1) that is communicatively coupled to the base station 105.

The scheduler 120 is configured to allocate resources among the access terminals 110 such that a certain degree of fairness (or other objective) is maintained, while also attempting to optimize the overall system throughput performance for the uplink. The scheduler 120 may therefore schedule uplink packet transmission based, at least in part, on the allowable transmit power spectrum density and power headroom feedback associated with each access terminal 110. The transmit power spectrum density is a measure of the power to bandwidth ratio used to transmit signals over the uplink and the power headroom is a measure of the power available at the access terminal 110 for transmission of signals over the uplink. Persons of ordinary skill in the art having benefit of the present disclosure should appreciate that other measures of the transmit power and the available power at the access terminal 110, as well as other parameters related to transmission over the uplink, may alternatively be fed back to the base station 105 and/or scheduler 120.

The scheduler 120 may also implement techniques for selecting the packet format for packets transmitted over the uplink. In one embodiment, the scheduler 120 schedules uplink transmissions over the air interfaces 115 by estimating signal-to-noise ratios for transmissions over the uplink. For example, the scheduler 120 may receive feedback from the access terminals 110 that indicates a requested spectral power density for uplink packet transmission. The scheduler 120 may use the feedback together with a signal-to-noise ratio of a reference channel and a measured noise level to estimate the signal-to-noise level. The scheduler 120 may then determine formats for transmitted packets based on the estimated signal-to-noise ratio and allocate resources for packet transmission based on the determined packet format. The scheduled resources may then be communicated to the access terminals 110, which may use the scheduled resources to transmit information over the uplink.

Figure 2:
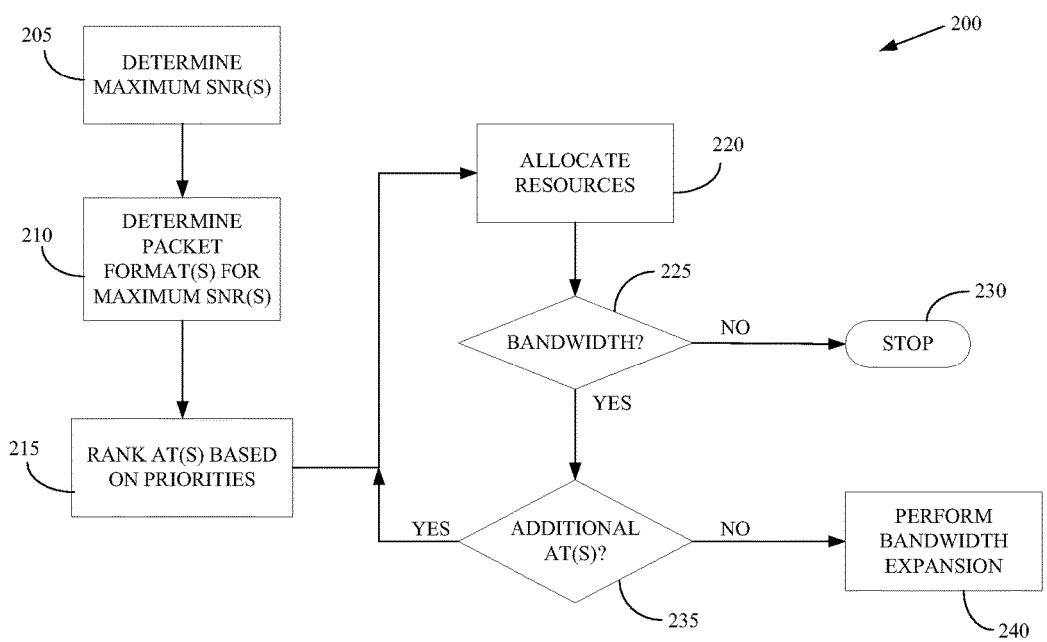
FIG. 2 conceptually illustrates one exemplary embodiment of a method of allocating resources for an uplink channel, in accordance with the present invention.

FIG. 2 conceptually illustrates one exemplary embodiment of a method 200 of allocating resources for an uplink channel. In the illustrated embodiment, the scheduler algorithm is implemented in an access network (AN) to provide wireless connectivity to a plurality of access terminals (AT). At each scheduling instance, the access network has access to information including the number of access terminals having new packets to transmit (N), the total number of available resource units (M) such as OFDMA tiles, the maximum transmit power for an access terminal ($PA_{max}$), and the received signal-to-noise power ratio of a reference channel ($E_{cf}/Nt_{CDMA}$), where the index i refers to an access terminal ($AT_i$). In the illustrated embodiment, the received signal-to-noise power ratio of the reference channel refers to the signal-to-noise power ratio of the pilot channel for $AT_i$ for the signal received at the access network.

Each access terminal may also feed back information to the access network. In the illustrated embodiment, access terminals feed back information indicating a requested transmit power spectrum density $\Delta_{req,i}$ for OFDM traffic channels. The requested transmit power spectrum density $\Delta_{req,i}$ is normalized to the transmit power spectrum density of a reference channel. For example, the requested transmit power spectrum density $\Delta_{req,i}$ may be normalized to a CDMA pilot channel transmit power spectrum density. In one embodiment, the requested transmit power spectrum density $\Delta_{req,i}$ is obtained using an interference management algorithm run at the access terminal. Each access terminal may also feedback the power headroom $PA_i$ for the access terminal.

The method 200 begins by determining (at 205) maximum signal-to-noise ratios for each of the access terminals that have new packets to transmit. The maximum signal-to-noise ratios can be determined using the requested transmit power spectrum density, the received signal-to-noise power ratio of a reference channel, and measures of the noise at the access network. For example, the maximum signal-to-noise ratio may be calculated as:

$$SNR_{max,i} = \Delta_{req,i} \times Ec_t/N_{t,ref} \times N_{t,ref}/N_{t,OFDM}$$

where:
$Ec_t/N_{t,ref}$: the received signal to noise power ratio of a reference channel.
In this context, it refers to the received signal to noise power ratio of i-th AT's pilot channel at AN.
$N_{t,ref}$: is the total received interference and thermal noise power over the bandwidth of the reference channel.
$N_{t,OFDM}$: is the total received interference and thermal noise power on OFDM segment.

The access network or other scheduling entity may then determine (at 210) a packet format corresponding to the maximum signal-to-noise ratio. In the illustrated embodiment, the access network determines (at 210) the packet format using a quantization procedure in which a lookup table is used to find a closest signal-to-noise ratio (e.g., the expected received signal-to-noise ratio for the chosen packet format) and the corresponding packet format for each access terminal. For example, the scheduled signal-to-noise ratio, the packet format, and the scheduled transmit power spectrum density for $AT_i$ may be defined as:

$$(SNR_{scheduled,i}, PF_{scheduled,i}) = PFTableLookUp(SNR_{max,i}),$$

$$\Delta_{scheduled,i} = SNR_{scheduled,i} \times (Ec_t/N_{t,ref})^{-1} \times N_{t,OFDM}/N_{t,ref}.$$

The lookup table PFTableLookUp( ) is a predefined lookup table that contains a list of supportable packet formats and the corresponding expected received signal-to-noise ratio values. In one embodiment, the entries in the lookup table can be dynamically adjusted using closed loop control techniques. In one embodiment, the access network may also determine (at 210) whether or not the access terminal is eligible for bandwidth expansion. For example, the access network may set a flag $f_{expand,i}$ using the following condition:

if $(PF_{scheduled,i} = PF_{min})$ then set $f_{expand,i} = 0$; otherwise $f_{expand,i} = 1$ where $PF_{min}$ is the minimum value of the packet format that is permitted for bandwidth expansion.

The access terminals may then be ranked (at 215) based upon a priority metric. In the illustrated embodiment, priority metrics are calculated for each of the access terminals and then the priority metrics are used to rank the access terminals. For example, a proportional fairness priority metric may be defined as:

$$Priority_i = \frac{SETableLookUp(PF_{scheduled,i})}{avgThroughput_i}$$

where the lookup table SETableLookUp( ) is a table function that outputs a spectral efficiency for a given packet format input and avgThroughput is the average throughput for the corresponding access terminal. The access terminals may then be ranked (at 215) based upon the proportional fairness priority metric. However, persons of ordinary skill in the art having benefit of the present disclosure should appreciate that other priority metrics may alternatively be used to rank the access terminals. Resources may then be sequentially allocated (at 220) to the access terminals based upon the order in ranking. For example, tiles may be allocated (at 220) to the highest ranked access terminal first, and then the 2nd place access terminal next, etc. Once an access terminal has been allocated with resource, it becomes ineligible for further allocation in the current round.

The access network may determine (at 225) whether bandwidth remains available for allocation to eligible access terminals after allocating (at 220) resources to one or more of the access terminals. For example, the access network may determine (at 225) whether or not any tile remains available for allocation. If no bandwidth remains, then the method 200 may stop (at 230). If some bandwidth remains available for allocation, the access network may determine (at 235) whether any other access terminals are eligible for scheduling. The access network may continue to allocate (at 220) resources to the eligible access terminals if any eligible access terminals remain. If no other access terminals are eligible for scheduling, the access network may determine (at 240) whether bandwidth expansion can be used to increase the resources allocated to one or more access terminals so that the remaining bandwidth may be used.

Figure 3:
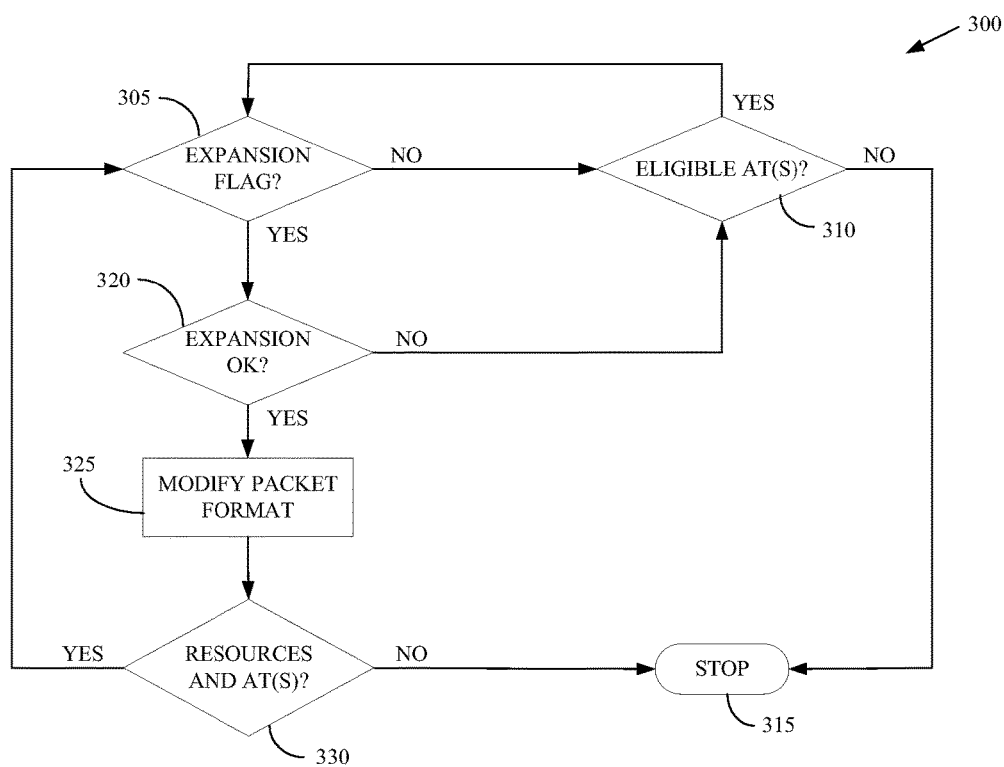
FIG. 3 conceptually illustrates one exemplary embodiment of a method of performing bandwidth expansion for uplink channels, in accordance with the present invention.

FIG. 3 conceptually illustrates one exemplary embodiment of a method 300 of performing bandwidth expansion for uplink channels. In the illustrated embodiment, the access network determines (at 305) whether the expansion flag $f_{expand,i}$ has been set for the corresponding access terminal. If the expansion flag $f_{expand,i}$ has not been set, then the access network determines (at 310) whether or not there are any more access terminals that are eligible for bandwidth expansion. In one embodiment, the exit of the method 300 can be determined using the condition:

$$\left(\bigvee_j f_{expand,j} == 0\right).$$

If this condition is satisfied, then there are no additional eligible access terminals and the method 300 stops (at 315). If this relationship is not satisfied, which indicates that there are additional eligible access terminals, the access network determines (at 305) whether the expansion flag is set for one of the remaining eligible access terminals. When the access network finds an access terminal that has an expansion flag that has been set, the access network determines (at 320) whether it is advantageous to perform bandwidth expansion for this access terminal.

In the illustrated embodiment, the access network determines (at 320) whether to perform bandwidth expansion by determining whether the resulting user throughput would be higher than it would be without bandwidth expansion. For example, the access network may set the packet format to an expanded value (by reducing the packet format by one step) using the relationship:

$$PF_{expand,j} = \max(PF_{scheduled,j} - 1, 0)$$

and then the access network may determine the corresponding signal-to-noise ratio using the expanded packet format. The modified/expanded packet format may then be used to determine the transmit power spectrum density $\Delta_{expand,i}$ and the number of scheduled tiles that will be allocated with bandwidth expansion $K_{expand,i}$ using the formulae:

$$\Delta_{expand,j} = SNR_{expand,j} \times (Ec_j/N_{t,ref})^{-1} \times N_{t,OFDM}/N_{t,ref}$$

$$K_{expand,j} = \min\left(K_{scheduled,j} + M, \max\left(\text{floor}\left(\frac{PA_j}{PA_{j,ref} \times \Delta_{expand,j}}\right), 0\right)\right),$$

where $K_{schedule,i}$ is the number of tiles that were originally scheduled without bandwidth expansion. The access network then determines (at 320) whether to perform bandwidth expansion for the access terminal by comparing the throughputs for the two cases. For example, the throughputs may be determined as a function of the packet format and the allocated number of tiles using a lookup table:

$$Thrp_{scheduled,j} = K_{scheduled,j} \times \text{SETableLookUp}(PF_{scheduled,j})$$

$$Thrp_{expand,j} = K_{expand,j} \times \text{SETableLookUp}(PF_{expand,j})$$

where $Thrp_{scheduled,j}$ is the throughput without bandwidth expansion;

$Thrp_{expand,j}$ is the throughput with bandwidth expansion;

$K_{scheduled,j}$ is the number of scheduled tiles without bandwidth expansion;

$K_{expand,j}$ is the number of scheduled tiles with bandwidth expansion;

If bandwidth expansion does not improve the overall throughput, and the access network may not modify the packet format and resources allocated to the current access terminal, may set the expansion flag to 0, and may determine (at 310) whether there are any additional eligible access terminals. If the access network determines (at 320) that bandwidth expansion will improve the overall throughput for the access terminal, then the packet format and the resource allocation may be modified (at 325), e.g. by reducing the packet format by one step.

The access network then determines (at 330) whether the available resources and/or the access terminals have been exhausted. For example, the access network determines (at 330) whether all the tiles have been allocated. The access network also determines (at 330) whether any bandwidth-expansion-eligible access terminals remain using the equation:

$$\left(\bigvee_j f_{expand,j} == 0\right)$$

If resources and bandwidth-expansion-eligible access terminals remain, and the access network continues to examine (at 305) the expansion flags of the remaining access terminals to determine whether or not to perform bandwidth expansion. If no resources or bandwidth-expansion-eligible access terminals remain, the method 300 stops (at 315).

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method of scheduling uplink transmissions from at least one access terminal to an access network, comprising:
  estimating, at the access network, at least one signal-to-noise ratio associated with said at least one access terminal, wherein estimating said at least one signal-to-noise ratio comprises estimating said at least one signal-to-noise ratio based upon a combination of a spectral power density requested by said at least one access terminal for transmission of at least one packet, at least one signal-to-noise ratio of a reference channel, and at least one measure of noise;
  determining, at the access network, a format for said at least one packet based upon said at least one estimated signal-to-noise ratio;
  allocating, at the access network, resources for transmission of said at least one packet over the uplink based on the determined format of said at least one packet, wherein allocating the resources for transmission of said at least one packet comprises determining at least one priority for said at least one packet based on the determined format for said at least one packet and an average throughput for said at least one access terminal.

2. The method of claim 1, wherein determining said at least one priority comprises determining said at least one priority by accessing a lookup table that returns a spectral efficiency based on the determined format, and wherein said at least one priority is set to the ratio of the returned spectral efficiency and the average throughput.

3. The method of claim 1, wherein allocating the resources for transmission of said at least one packet comprises ranking said at least one packet based on said at least one priority and allocating the resources according to the ranking.

4. A method of scheduling uplink transmissions from at least one access terminal to an access network, comprising:
- estimating, at the access network, at least one signal-to-noise ratio associated with said at least one access terminal, wherein estimating said at least one signal-to-noise ratio comprises estimating said at least one signal-to-noise ratio based upon a combination of a spectral power density requested by said at least one access terminal for transmission of at least one packet, at least one signal-to-noise ratio of a reference channel, and at least one measure of noise;
- determining, at the access network, a format for said at least one packet based upon said at least one estimated signal-to-noise ratio;
- allocating, at the access network, resources for transmission of said at least one packet over the uplink based on the determined format of said at least one packet, wherein allocating the resources for transmission of said at least one packet comprises determining a throughput associated with said at least one access terminal if the bandwidth allocated to said at least one access terminal is expanded and expanding the bandwidth allocated for transmission by said at least one access terminal if the throughput increases as a result of bandwidth expansion; and
- transmitting, from the access network, information indicative of the resources allocated to said at least one access terminal.

* * * * *